(12) United States Patent
Kim et al.

(10) Patent No.: US 10,411,270 B2
(45) Date of Patent: Sep. 10, 2019

(54) BUS PLATE UNIT

(71) Applicants: Hyundai Motor Company, Seoul (KR); Kia Motors Corporation, Seoul (KR)

(72) Inventors: Duck Whan Kim, Gyeonggi-Do (KR); Seungjun Yeon, Gyeonggi-do (KR); JuHan Kim, Gyeonggi-do (KR); Young Bum Kum, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 159 days.

(21) Appl. No.: 15/251,617

(22) Filed: Aug. 30, 2016

(65) Prior Publication Data

US 2017/0338498 A1 Nov. 23, 2017

(30) Foreign Application Priority Data

May 18, 2016 (KR) .................. 10-2016-0060746

(51) Int. Cl.
*H01M 8/0247* (2016.01)
*H01M 8/2465* (2016.01)
*H01M 8/0228* (2016.01)

(52) U.S. Cl.
CPC ....... *H01M 8/0247* (2013.01); *H01M 8/0228* (2013.01); *H01M 8/2465* (2013.01)

(58) Field of Classification Search
None
See application file for complete search history.

(56) References Cited

U.S. PATENT DOCUMENTS

| 2011/0117408 A1* | 5/2011 | Lennox ............. | H01M 2/0277 |
| | | | 429/99 |
| 2016/0056433 A1* | 2/2016 | Yokoyama ......... | H01M 2/1077 |
| | | | 429/54 |

FOREIGN PATENT DOCUMENTS

| JP | 2001-314019 | | 11/2001 |
| JP | 2014-512071 | | 5/2014 |
| JP | 2014-203747 | A | 10/2014 |
| JP | 2015-069729 | A | 4/2015 |
| KR | 10-2014-0019951 | A | 2/2014 |
| KR | 10-1404935 | | 5/2014 |
| KR | 10-2014-0072689 | A | 6/2014 |

* cited by examiner

*Primary Examiner* — Carmen V Lyles-Irving
(74) *Attorney, Agent, or Firm* — Mintz Levin Cohn Ferris Glovsky and Popeo, P.C.; Peter F. Corless

(57) ABSTRACT

A bus plate unit is provided. The bus plate unit electrically connects a unit stack for a fuel cell having a (+) and a (−) stack terminal at both sides. The unit includes a (+) bus plate having a first end portion bent toward a first side surface of the unit stack and electrically coupled to a (+) stack terminal of the unit stack. A second end portion has a (+) bus terminal and abuts an upper first side of the unit stack. A (−) bus plate has a first end portion bent toward a second side surface of the unit stack and electrically coupled to the (−) stack terminal of the unit stack. A second end portion provides a (−) bus terminal and is proximate to the upper second side of the unit stack. An insulating layer encloses a surface of the (+) bus plate and the (−) bus plate.

13 Claims, 5 Drawing Sheets

BUS PLATE UNIT

CROSS-REFERENCE TO RELATED APPLICATION

This application claims priority to and the benefit of Korean Patent Application No. 10-2016-0060746 filed in the Korean Intellectual Property Office on May 18, 2016, the entire contents of which are incorporated herein by reference.

BACKGROUND

(a) Field of the Invention

The present invention relates to a bus plate unit and more particularly, to a bus plate unit that reduces the separation cavity using a thin plate and increases a contact area to improve an output density of a unit stack.

(b) Description of the Related Art

Generally, a fuel cell system is a power generation system that generates electric energy through an electrochemical reaction of hydrogen and oxygen and is applied to a fuel cell vehicle. The fuel cell system includes a fuel cell stack, a hydrogen supply component configured to supply hydrogen to the fuel cell stack, an air supply component configured to supply air to the fuel cell stack, and a heat/water controller that removes reaction heat and water of the fuel cell stack and adjust an operation temperature of the fuel cell stack. The fuel cell stack includes a unit stack module in which a plurality of unit cells are bundled together and an enclosure that protects the unit stack module.

In particular, the fuel cell stack may include a single stack including a plurality of unit stack modules therein. The unit stack module generates electric energy by the electric chemical reaction of hydrogen and air. Additionally, the unit stack module generates heat and water as by-products of the reaction and the cooling is performed by a coolant, which is a cooling medium. The unit stack generates high current of about 300 A or greater and the high current flows through a wire or a bus bar. For example, the bus bar is not flexible, however substantial amount of electrical energy may be transmitted and a mechanical strength is substantial.

However, the above-described conventional bus bar is formed of a square cross-section and this entire volume of the unit stack mounted with the bus bar is increased. Additionally, as the volume of the unit stack increases, the mounting space is restricted and a separation cavity is formed proximate to the bus bar.

The above information disclosed in this section is merely for enhancement of understanding of the background of the invention and therefore it may contain information that does not form the prior art that is already known in this country to a person of ordinary skill in the art.

SUMMARY

An exemplary embodiment of the present invention provides a bus plate unit that increases the contact area with the unit stack by using a thin plate and improves the output density of the unit stack by reducing the separation cavity.

In particular, the bus plate unit to electrically coupled to a unit stack for a fuel cell having a (+) stack terminal and a (−) stack terminal at both sides according to an exemplary embodiment of the present invention may include a (+) bus plate having a first end portion bent toward a first side surface of the unit stack and electrically coupled to a (+) stack terminal of the unit stack and a second end portion disposed with a (+) bus terminal and abuts an upper first side of the unit stack, a (−) bus plate having a first end portion bent toward a second side surface of the unit stack and electrically coupled to the (−) stack terminal of the unit stack and a second end portion that provides a (−) bus terminal and abuts the upper second side of the unit stack and an insulating layer that encloses the (+) bus plate and the (−) bus plate.

The (+) bus plate and the (−) bus plate may be respectively formed of a thin plate and may have a predetermined width to cover an exterior predetermined region of the unit stack. A (+) contact aperture may be formed at the first end portion of the (+) bus plate. The (+) contact aperture may be coupled to the (+) stack terminal of the unit stack through the bolt terminal to electrically couple the (+) bus plate with the unit stack. A (−) contact aperture (−) may be formed at the first end portion of the bus plate and the (−) contact aperture may be connected with the (−) stack terminal of the unit stack through the bolt terminal to electrically couple the (−) bus plate with the unit stack.

The insulating layer may be formed of a polyphenylene ether (PPE) material and may have a thickness of about 0.5 mm. The bus plate unit may further include a center bus plate disposed at the upper surface of the upper unit stack to enclose the surface by the insulating layer. A first end portion bent toward a first side surface of the unit stack may proximate to the exterior surface of the (+) bus plate and a second end portion bent toward a second side surface of the unit stack may abut the interior surface of the (−) bus plate. A plurality of end portions respectively may be coupled to the (+) stack terminal and the (−) stack terminal of the unit stack when a plurality of unit stacks are stacked vertically. The center bus plate may be formed of the thin plate.

The (+) contact aperture may be formed at the first end portion of the center bus plate. The (+) contact aperture may be connected with the (+) stack terminal of the unit stack through the bolt terminal to electrically couple the first end part of the center bus plate with the unit stack disposed at the lower portion. The (−) contact aperture may be formed at a second end portion of the center bus plate. The (−) contact aperture may be coupled to the (−) stack terminal of the unit stack through the bolt terminal to electrically couple a second end portion of the center bus plate with the unit stack disposed at the upper portion.

The center bus plate may have a (+) bolt penetration aperture formed that corresponds to the (+) contact aperture of the (+) bus plate. The (−) bus plate may have a (−) bolt penetration aperture that corresponds to the (−) contact aperture of the center bus plate. The insulating layer may be formed of the polyphenylene ether (PPE) material and may have the thickness of about 0.5 mm.

The center bus plate may have a terminal aperture formed that corresponds to the (+) bus terminal of the (+) bus plate. The (+) bus terminal may penetrate the terminal aperture to be electrically coupled to a junction box disposed on the exterior along with the (−) bus terminal. The center bus plate may have an inclined component that is inclined in a length direction disposed between the (+) bus terminal and the (−) bus terminal. The inclined component may be formed to be inclined toward the upper portion by the thickness (t) of the (+) bus plate with reference to an imaginary line L that extends beyond a bottom surface of the center bus plate.

An exemplary embodiment of the present invention may utilize the thin plate to extend the contact area with the unit stack in a horizontal direction and the separation cavity may be reduced to improve the output density of the unit stack. Additionally, an exemplary embodiment of the present invention applies the inclined component to the center bus plate disposed between the (+) bus terminal and the (−) bus terminal coupled to the junction box J to minimize the thickness and reduce the size of the unit.

Further, effects that can be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

The above and other objects, features and other advantages of the present invention will be more clearly understood from the following detailed description when taken in conjunction with the accompanying drawings, in which.

DESCRIPTION OF SYMBOLS

Figure 1:
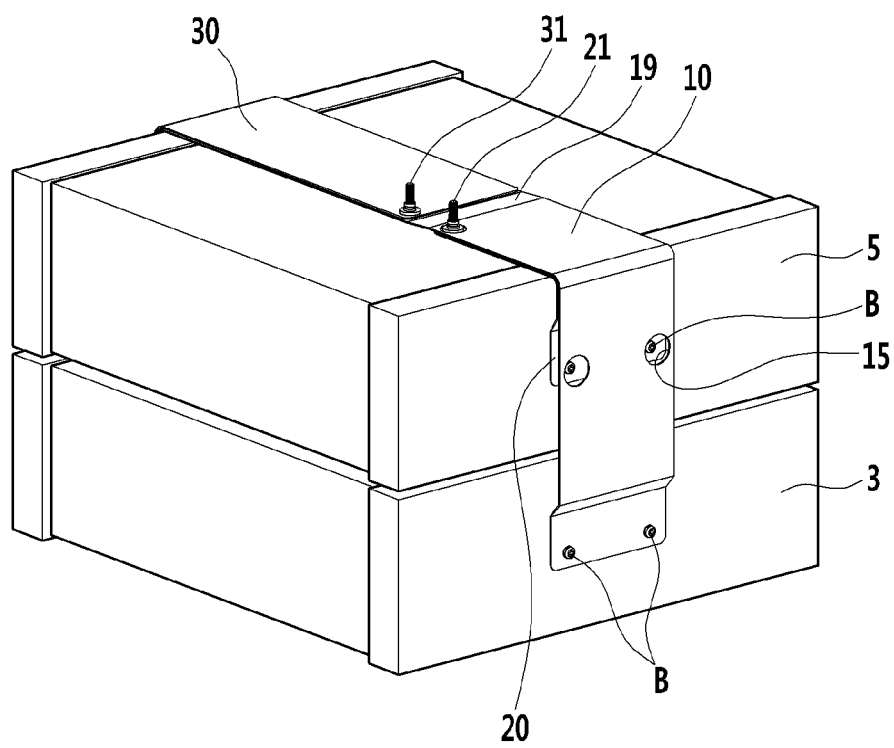
FIG. 1 is an exemplary perspective view that a bus plate unit according to an exemplary embodiment of the present invention is applied.

1: bus plate unit
3: lower unit stack
5: upper unit stack
10: center bus plate
11: first (+) contact aperture
13: terminal aperture
15: (+) bolt penetration aperture
17: first (−) contact aperture
19: inclined component
B: bolt terminal
20: (+) bus plate
21: (+) bus terminal
23: second (+) contact aperture
30: (−) bus plate
31: (−) bus terminal
33: second (−) contact aperture
35: (−) bolt penetration aperture
40: insulating layer
J: Junction Box

DETAILED DESCRIPTION

Hereinafter, exemplary embodiments of the present invention will be described with reference to the accompanying drawings. However, the drawings to be described below and the following detailed description relate to one exemplary embodiment of various exemplary embodiments for effectively explaining the characteristics of the present invention. Therefore, the present invention should not be construed as being limited to the drawings and the following description.

Further, in the description of the present invention, the detailed description of related well-known configurations and functions is not provided when it is determined as unnecessarily making the scope of the present invention unclear. In addition, the terminologies to be described below are ones defined in consideration of their function in the present invention and may be changed by the intention of a user, an operator, or a custom. Therefore, their definition should be made on the basis of the description of the present invention.

A part irrelevant to the description will be omitted to clearly describe the present disclosure, and the same or similar constituent elements will be designated by the same reference numerals throughout the specification. Terms or words used in the specification and the claims should not be interpreted as being limited to a general or dictionary meaning and should be interpreted as a meaning and a concept which conform to the technical spirit of the present disclosure based on a principle that an inventor can appropriately define a concept of a term in order to describe his/her own disclosure by the best method.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 2:
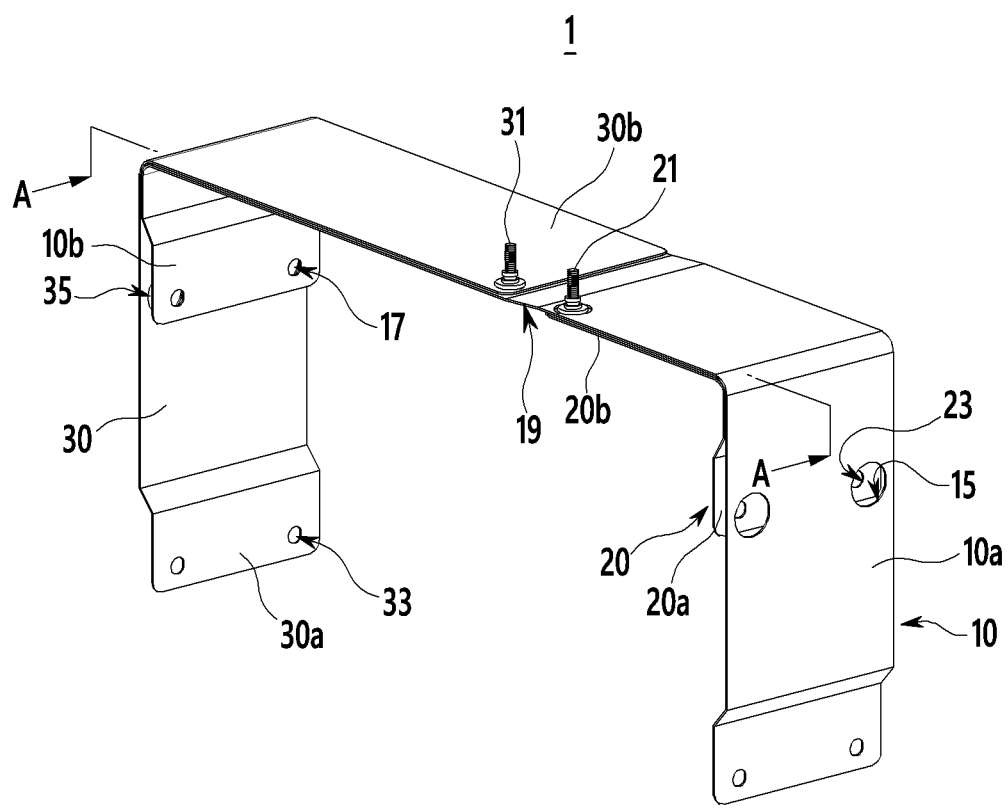
FIG. 2 is an exemplary perspective view of a bus plate unit according to an exemplary embodiment of the present invention.
Figure 3:
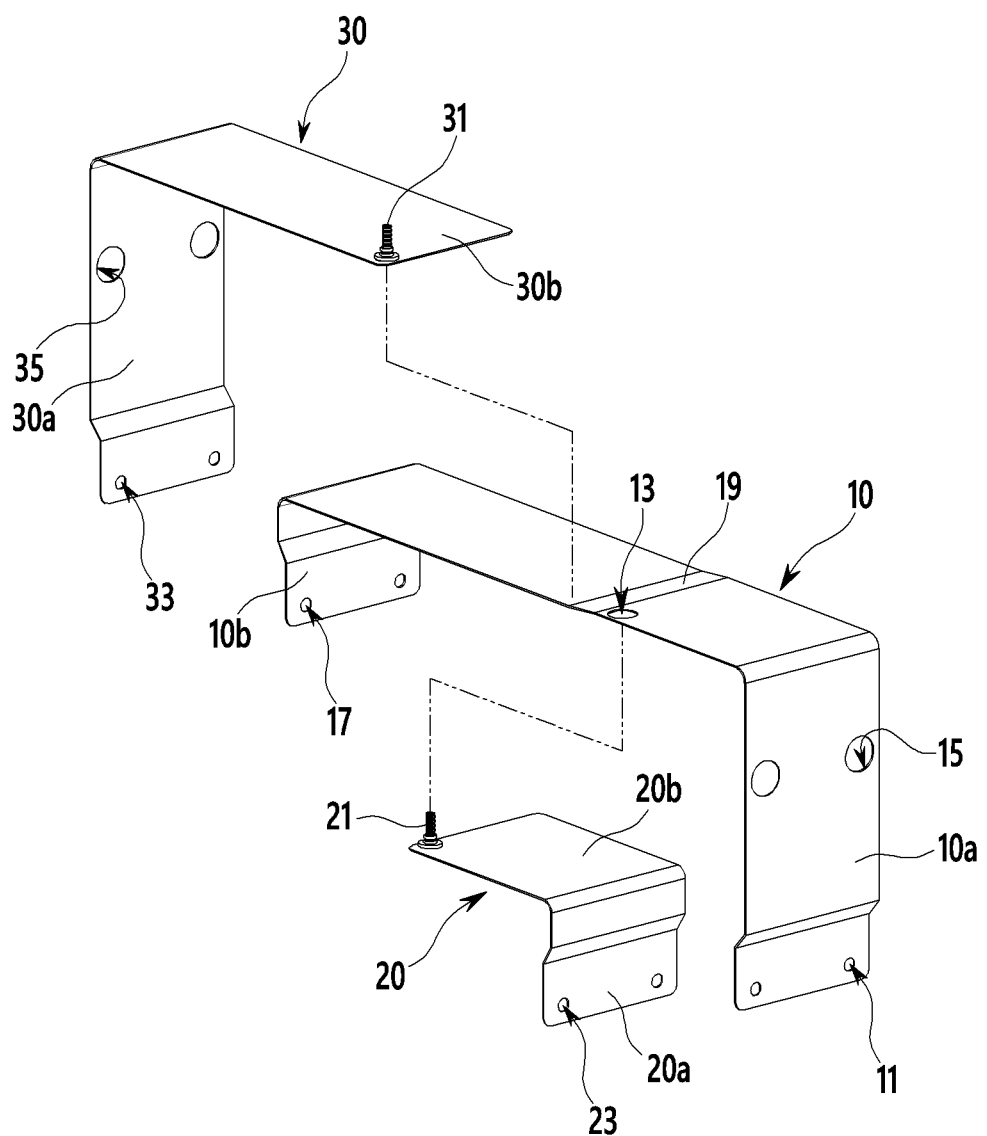
FIG. 3 is an exemplary exploded perspective view of a bus plate unit according to an exemplary embodiment of the present invention.
Figure 4:
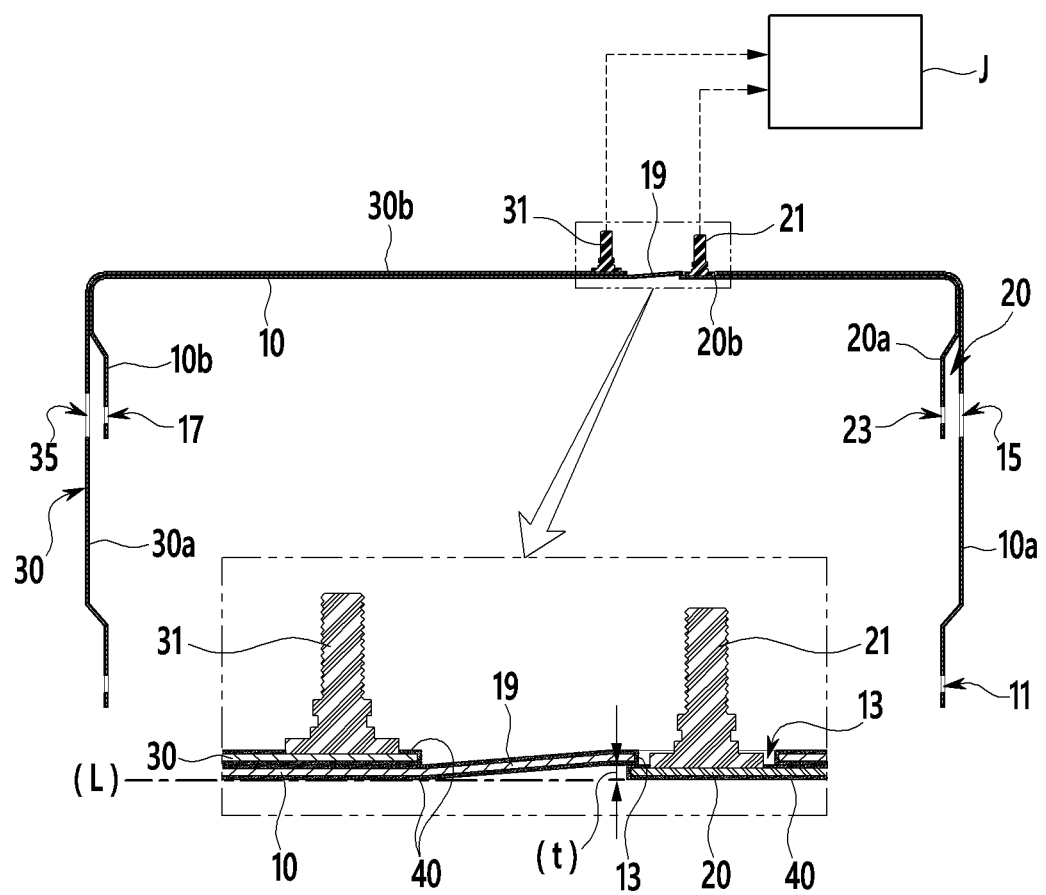
FIG. 4 is an exemplary cross-sectional view taken along a line A-A of FIG. 2 according to an exemplary embodiment of the present invention.

FIG. 1 is an exemplary perspective view that a bus plate unit according to an exemplary embodiment of the present invention. FIG. 2 is an exemplary perspective view of a bus plate unit according to an exemplary embodiment of the present invention. FIG. 3 is an exemplary exploded perspective view of a bus plate unit according to an exemplary embodiment of the present invention. FIG. 4 is an exemplary cross-sectional view taken along a line A-A of FIG. 2.

Referring to FIG. 1 to FIG. 3, a bus plate unit 1 according to an exemplary embodiment of the present invention may electrically connect unit stacks for a fuel cell of a vehicle in series. A plurality of unit stack applied with a bus plate unit 1 according to an exemplary embodiment of the present invention may include a lower unit stack 3 and an upper unit stack 5 respectively having a (+) stack terminal and (−) a stack terminal at both sides. In the present exemplary embodiment, the unit stack may include the lower unit stack 3 and the upper unit stack 5 as described, however it is not limited thereto and the number of the unit stacks may be adjusted and applied.

The bus plate unit 1 may include a center bus plate 10, a (+) bus plate 20, and a (−) bus plate 30. First, the center bus plate 10 may be formed of the thin plate. Further, in the upper portion of the upper unit stack 5, a first end portion and a second end portion may be respectively bent in a downward direction toward a first side surface and a second side surface of the upper unit stack 5. In other words, the center bus plate 10 may be two horizontal lines connected at an approximately a right angle by a vertical line (e.g., "⊏" character) shape in which the lower portion is opened. Additionally, a first (+) contact aperture 11 may be formed in a first end portion 10a of the center bus plate 10. The first (+) contact aperture may be coupled to the (+) stack terminal of the lower unit stack 3 through a bolt terminal B to electrically couple a first end portion 10a of the center bus plate 10 with the lower unit stack 3. In particular, the center bus plate 10 may be coupled to the lower unit stack 3 through the bolt terminal B.

Additionally, the center bus plate 10 may be formed to include a terminal aperture 13 that corresponds to the (+) bus terminal 21 of a (+) bus plate 20 that will be described in further detail. The center bus plate 10 may be formed to include a (+) bolt penetration aperture 15 that corresponds to the (+) stack terminal of the upper unit stack 5. The (+) bolt penetration aperture 15 may be formed to have a greater geometric size than the bolt terminal B penetrated with the bolt terminal B. Further, a second end portion of the center bus plate 10 may be formed to include the first (−) contact aperture 17.

The first (−) contact aperture 17 may be coupled to the (−) stack terminal of the upper unit stack through the bolt terminal B to electrically couple a second end portion 10b of the center bus plate 10 to the upper unit stack 5. The center bus plate 10 may be coupled to the upper unit stack 5 through the bolt terminal B. In other words, the first (+) contact aperture 11 may be formed at the bent first end portion 10a of the center bus plate 10.

Furthermore, the center bus plate 10 may include an inclined component 19 inclined along a length direction corresponding between the (+) bus terminal 21 and the (−) bus terminal 31 that will be described later. In other words, the inclined component 19, as shown in FIG. 4, may be formed to be inclined vertically upward by the thickness t of the (+) bus plate 20 with reference to an imaginary line L that extends beyond the bottom surface of the center bus plate 10. Accordingly, the center bus plate 10, the (+) bus plate 20, and the (−) bus plate 30 may be deposited to be mounted to the lower and upper unit stack 3 and 5, thereby minimizing the entire thickness.

In the present exemplary embodiment, the (+) bus plate 20 may include the thin plate and the exterior surface may abut the interior of a first end portion of the center bus plate 10. The (+) bus plate 20 may include a first end portion 20a bent toward a first side surface of the upper unit stack 5 and may be electrically coupled to the (+) stack terminal of the upper unit stack 5. A second end portion 20b of the (+) bus plate 20 may include the (+) bus terminal 21 and may abut the upper first side of the upper unit stack 5. The (+) bus terminal 21 may be configured to penetrate the terminal aperture 13 of the center bus plate 10 to protrude vertically in an upward direction.

The second (+) contact aperture 23 may be formed at the bent first end portion of the (+) bus plate 20. The second (+) contact aperture 23 may be coupled to the (+) stack terminal of the upper unit stack 5 through the bolt terminal B to electrically couple the (+) bus plate 20 to the upper unit stack 5.

Furthermore, the (−) bus plate 30 may include the thin plate and the interior surface may abut the exterior of a second end portion of the center bus plate 10. A first end portion 30a of the (−) bus plate 30 may be bent toward a second side surface of the lower unit stack 3 and may be electrically coupled to the (−) stack terminal of the lower unit stack 3. A second end portion 30b of the (−) bus plate 30 may include the (−) bus terminal 31 and may abut the upper second side of the upper unit stack 5. The (−) bus terminal 31 may be disposed on one substantially straight line with the (+) bus terminal 21.

In particular, the (+) bus terminal penetrates the terminal aperture 13 may be electrically coupled to the junctions box disposed on the exterior along with the (−) bus terminal 31. The second (−) contact aperture 33 may be formed at the bent first end portion of the (−) bus plate 30. The second (−) contact aperture 33 may be coupled to the (−) stack terminal of the lower unit stack 3 through the bolt terminal B to electrically couple the (−) bus plate 30 to the lower unit stack 3. In the (−) bus plate 30, the (−) bolt penetration aperture 35 may be formed at the side surface that corresponds to the first (−) contact aperture 17 of the center bus plate 10. The (−) bolt penetration aperture 35 may be formed to have a greater geometric size than the bolt terminal B penetrated by the bolt terminal B.

Referring to FIG. 4, the above-configured bus plate unit 1 may further include an insulating layer 40. The insulating layer 40 may enclose the surface of the center bus plate 10, the (+) bus plate 20, and the (−) bus plate 20. The insulating layer 40 may electrically insulate the bus plate unit 1.

An assembly process of the above-configured bus plate unit 1 may be as followings. First, the (+) bus plate 20 enclosed with the insulating layer 40 on the surface may be coupled to a first side of the upper unit stack 5. Next, the center bus plate 10 enclosed with the insulating layer 40 may be coupled when the interior surface abuts the upper portion of the (+) bus plate 20.

The (−) bus plate 30 enclosed with the insulating layer 40 may be assembled when the interior surface abuts the upper portion of the center bus plate 10 coupled to the (−) stack terminal of the lower unit stack 3 at a second side of the upper unit stack 5. For example, the insulating layer 40 may be formed of a polyphenylene ether (PPE) material and may have a thickness of about 0.5 mm. In other exemplary embodiments, the insulating layer 40 may be formed of the PPE material and may have a thickness of about 0.5 mm, however it is not limited thereto and the material and the thickness of the insulating layer 40 may be adjusted.

Figure 5:
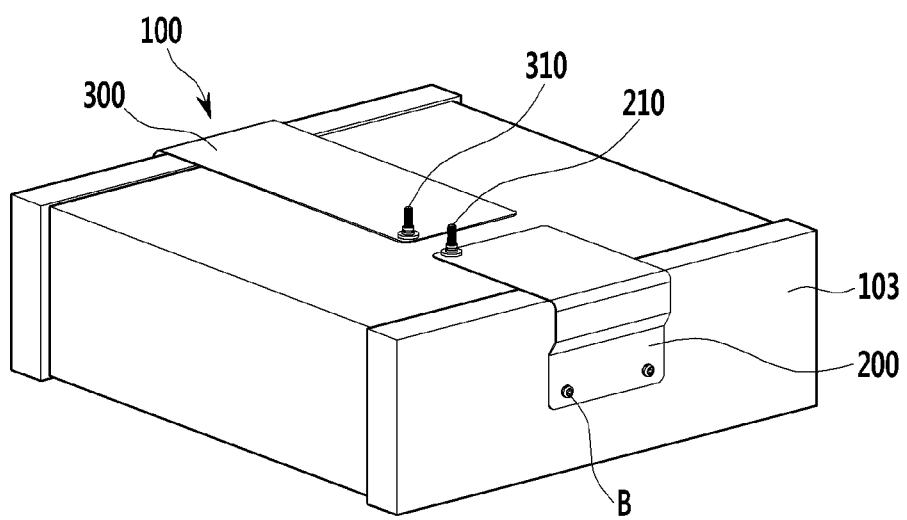
FIG. 5 is an exemplary perspective view that a bus plate unit according to an exemplary embodiment of the present invention.

FIG. 5 is an exemplary perspective view of a bus plate unit according to an exemplary embodiment of the present invention. Referring to FIG. 5, a bus plate unit 100 may electrically connect a first unit stack 103 respectively having the (+) stack terminal and the (−) stack terminal at both sides. For example, the bus plate unit 100 may include the (+) bus plate 200 and the (−) bus plate 300. The (+) bus plate 200 may be formed of the thin plate. The first end portion of the (+) bus plate 200 may be bent toward a first side surface of the unit stack 103 and may abut the upper first side of the unit stack 103. The bent first end portion of the (+) bus plate 200 may be electrically coupled to the (+) stack terminal of the unit stack and the (+) bus terminal 210 may be disposed at a second end portion. Additionally, the (+) contact aperture (not shown) may be formed at the bent first end portion of the (+) bus plate 200. The (+) contact aperture may be coupled with the (+) stack terminal of the unit stack 103 through the bolt terminal B to electrically couple the (+) bus plate 200 with the unit stack 103.

The (−) bus plate 300 may be formed of the thin plate. The first end portion of the (−) bus plate 300 may be bent toward a second side surface of the unit stack 103 and may abut the upper second side of the unit stack 103. The bent first end portion of the (−) bus plate 300 may be electrically coupled to the (−) stack terminal of the unit stack and the (−) bus terminal 310 may be disposed at a second end portion. Additionally, the (−) contact aperture (not shown) may be formed at the bent first end portion of the (−) bus plate 300. The (−) contact aperture may be coupled with the (−) stack terminal of the unit stack 103 through the bolt terminal B to electrically couple the (−) bus plate 300 with the unit stack 103. For example, the (−) bus terminal 310 may be disposed on one substantially straight line with the (+) bus terminal 210 of the (+) bus plate 200.

The insulating layer 400 formed of the PPE material with the 0.5 mm thickness may be enclosed at the surface of the (+) bus plate 200 and the (−) bus plate 300. The bus plate units 1 and 100 according to the exemplary embodiments of the present invention may apply the thin plate to expand, in a width direction, the contact area with the unit stack and reduce the separation cavity, to improve the output density of the unit stack. Additionally, by applying the inclined component 19 to the center bus plate 10 disposed between the (+) bus terminal and the (−) bus terminal that are connected to the junction box J, the thickness may be minimized and the size may be reduced.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A bus plate unit electrically coupled to a unit stack for a fuel cell having a (+) stack terminal and a (−) stack terminal at both sides, comprising:
    a (+) bus plate having a first end portion that is bent toward a first side surface of the unit stack and is electrically coupled to a (+) stack terminal of the unit stack and a second end portion that provides a (+) bus terminal and is proximate to an upper first side of the unit stack;
    a (−) bus plate having a first end portion that is bent toward a second side surface of the unit stack and is electrically connected to the (−) stack terminal of the unit stack and a second end portion that provides a (−) bus terminal and is proximate to the upper second side of the unit stack;
    an insulating layer that encloses an entire surface of the (+) bus plate and the (−) bus plate; and
    a center bus plate disposed at the upper surface of the upper unit stack to enclose the entire surface by the insulating layer,
    wherein the center bus plate includes a first end portion and a second end portion, wherein the first end portion is bent downward toward the first side surface of the unit stack and the second end portion is bent downward toward the second side surface of the unit stack,
    wherein an exterior surface of the (+) bus plate abuts an interior of the first end portion of the center bus plate,
    wherein an interior surface of the (−) bus plate abuts an exterior of the second end portion of the center bus plate, and
    wherein the first end portion of the center bus plate is coupled to the (+) stack terminal of the unit stack and the second end portion of the center bus plate is coupled to the (−) stack terminal of the unit stack, when a plurality of unit stacks are stacked vertically.

2. The bus plate unit of claim 1, wherein the (+) bus plate and the (−) bus plate are respectively formed of a plate having a width to cover an exterior region of the unit stack.

3. The bus plate unit of claim 1, wherein a (+) contact aperture is formed at the first end portion of the (+) bus plate, and the (+) contact aperture is connected with the (+) stack terminal of the unit stack through a bolt terminal to electrically connect the (+) bus plate with the unit stack.

4. The bus plate unit of claim 1, wherein a (−) contact aperture (−) is formed at the first end portion of the bus plate, and the (−) contact aperture is coupled to the (−) stack terminal of the unit stack through a bolt terminal to electrically connect the (−) bus plate with the unit stack.

5. The bus plate unit of claim 1, wherein the insulating layer is formed of a polyphenylene ether (PPE) material and has a thickness of about 0.5 mm.

6. The bus plate unit of claim 1, wherein
    the (+) contact aperture is formed at the first end portion of the center bus plate, the (+) contact aperture is coupled to the (+) stack terminal of the unit stack through a bolt terminal to electrically couple the first end portion of the center bus plate with the unit stack disposed at the lower portion, and
    the (−) contact aperture is formed at a second end portion of the center bus plate, the (−) contact aperture is connected with the (−) stack terminal of the unit stack through the bolt terminal to electrically couple a second end portion of the center bus plate with the unit stack disposed at the upper portion.

7. The bus plate unit of claim 6, wherein the center bus plate has a (+) bolt penetration aperture that corresponds to the (+) contact aperture of the (+) bus plate.

8. The bus plate unit of claim 6, wherein the (−) bus plate has a (−) bolt penetration aperture that corresponds to the (−) contact aperture of the center bus plate.

9. The bus plate unit of claim 1, wherein the insulating layer is formed of the polyphenylene ether (PPE) material and has the thickness of about 0.5 mm.

10. The bus plate unit of claim 1, wherein the center bus plate has a terminal aperture formed corresponding to the (+) bus terminal of the (+) bus plate.

11. The bus plate unit of claim 10, wherein the (+) bus terminal penetrates the terminal aperture to be electrically connected to a junction box disposed on the exterior with the (−) bus terminal.

12. The bus plate unit of claim 1, wherein the center bus plate has an inclined component that is inclined along a length direction by corresponding between the (+) bus terminal and the (−) bus terminal.

13. The bus plate unit of claim 12, wherein the inclined component is inclined toward the upper portion by the thickness (t) of the (+) bus plate with reference to an imaginary line L passing a bottom surface of the center bus plate.

* * * * *